United States Patent Office 2,935,440
Patented May 3, 1960

2,935,440

METHOD OF PROTECTING ORGANIC MATERIAL AGAINST FUNGI COMPRISING APPLYING A 1,2-NAPTHOQUINONE 1-OXIME

Glentworth Lamb, Stamford, and James W. Clapp, Darien, Conn., assignors to American Cyanamid Company, New York, N.Y., a corporation of Maine No Drawing. Application August 20, 1958
Serial No. 756,084

8 Claims. (Cl. 167—32)

This invention relates to fungicides. More particularly, it relates to an improved method and composition for the prevention and control of fungus infestations of agricultural, organic and related articles.

In accordance with the present invention, it has been surprisingly found that fungus infestations of seeds, plants, fruits and the like can be prevented and controlled to an unusual degree by the use of a composition containing as an active fungicidal ingredient at least one compound of the formula

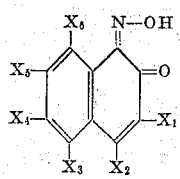

in which $X_1$–$X_6$ are selected from hydrogen, hydroxy, alkoxy and halogen; and the alkali metal salts thereof.

Typical examples of the fungicides according to this invention are 1,2-naphthoquinone 1-oxime, 3-bromo-1,2-naphthoquinone 1-oxime, 6-bromo-1,2-naphthoquinone 1-oxime, 3,6-dibromo-1,2-naphthoquinone 1-oxime, 3-chloro-1,2-naphthoquinone 1-oxime, 4-chloro-1,2-naphthoquinone 1-oxime, 6-chloro-1,2-naphthoquinone 1-oxime, 7-ethoxy-1,2-naphthoquinone 1-oxime, 6-hydroxy-1,2-naphthoquinone 1-oxime, 3-hydroxy-1,2-naphthoquinone 1-oxime, 7-hydroxy-1,2-naphthoquinone 1-oxime, 6-methoxy-1,2-naphthoquinone 1-oxime, 7-methoxy-1,2-naphthoquinone 1-oxime, 3-bromo-7-hydroxy-1,2-naphthoquinone 1-oxime, 6-bromo-7-hydroxy-1,2-naphthoquinone 1-oxime, 6,7-dibromo-3-hydroxy-1,2-naphthoquinone 1-oxime, 6,7-dihydroxy-3-methoxy-1,2-naphthoquinone 1-oxime, and the like; and their alkali metal salts.

In general, the 1,2-naphthoquinone 1-oximes of this invention can be readily synthesized by reacting 2-naphthol or a substituted 2-naphthol with nitrous acid. The monovalent metal salts can be prepared by mixing an aqueous solution of the metal hydroxide with a concentrated alcoholic solution of the oxime, concentrating if necessary, and recovering the solid product.

It is an advantage of the present invention that the fungicidal compounds are effective in extremely dilute concentrations. Accordingly, they may be employed as compositions comprising any of a variety of suitable carriers or diluents. Such compositions can be prepared as a suspension or solution in a suitable liquid, or as a dust. A suspension or dispersion of the free oxime in a non solvent such as water or an aqueous solution of an alkali metal salt thereof can be advantageously prepared for plant foliage treatment.

For the protection of fruits, seeds, plant tubers and the like during storage, it is advantageous to treat them by employing an aqueous emulsion of the free oxime or an aqueous solution of the salt. An emulsion of the free oxime may be formed by dissolving the fungicide in an oil and emulsifying the solution in water. The oil which can be used as a solvent for the oximes of the present invention is a hydrocarbon, as for example, benzene or toluene, or a halogenated hydrocarbon, such as chlorobenzene, chloroform, fluorotrichloromethane or dichlorodifluoromethane.

Fungicidal dust may also be prepared by mixing the instant oximes or their salts with dusting materials as for example clay, pyrophyllite, bentonite, pumice, fuller's earth and the like. Accordingly, seeds can be protected from soil organisms harmful to them by incorporating the present compounds with a solid carrier and mixing the composition with the seed as by tumbling.

The dosage employed in any particular case will necessarily vary. It is dependent upon the particular oxime compound employed, the material being treated and the method of application. In addition, in the case of application to living vegetation and seeds, the dosage is also dependent upon the susceptibility of the particular vegetation to the particular oxime compound, the state and condition of growth of the vegetation as well as climatic conditions prevailing. The optimum dosage employed in each case can readily be determined by those skilled in the art by conventional means. In general, when applied as a foliar spray to vegetation, a dosage rate of from 1–4 lbs. of fungicide per acre is adequate. When applied to seed, a dosage of about 0.5–4 oz./100 pounds of seed is generally employed. The usual practice is to employ about 0.0005–0.02 pound of oxime compound per pound of organic matter being treated.

The concentration of oxime compound to inert carrier or diluent may likewise be varied. In general, up to about 10% by weight of the oxime compound based upon the weight of the inert carrier is generally quite satisfactory. In most cases, from about 0.01% to 1% of active ingredient and preferably about 0.15% is adequate for aqueous dispersions and solutions. For dust compositions, about 5% of active ingredient is adequate for most applications.

When the free oximes are employed as suspensions or emulsions, the compositions may advantageously contain a surface active agent. Examples of such surface active agents well known in the art include the fatty acid esters of polyhydric alcohols, the sodium salt of a polymerized propyl naphthalene sulfonic acid formed by condensing formaldehyde with propyl naphthalene sodium sulfonate, the alkylarylpolyether alcohols, and the like. Usually, a good practice is to add from one to about five parts of surface active agent per 100 parts of fungicide compound.

In addition to an oxime compound, a composition according to this invention may also contain other active ingredients which, in addition, may serve as the carrier. These active ingredients in admixture can be herbicides, insecticides, fertilizers and the like. Thus, for example, an effective dose of a fungicide according to the present invention and an insecticide such as DDT suspended in water in the presence of a surface active agent can be employed as a multi-purpose fungicidal preparation.

The term fungicide as used in this specification and claims is meant to include not only a material having the property of destroying fungi, but also the property of inhibiting the germination of spores of the fungi. It is an advantage of the present invention that the compositions thereof have both properties to an unusual degree.

This invention is further illustrated by the following examples.

EXAMPLE 1

Tests are conducted to determine the fungicidal activity of the compounds listed in the following Table I on spores of *Sclerotinia fructigena* and *Stemphylium sarcinaeforme*, which are both fungi and parasitic on stone fruits and clover, respectively. These organisms are cultured on potato dextrose agar slants. Spores are obtained in abundance from 14-day old cultures of *Stemphylium sarcinaeforme* and 7-day old cultures of *Sclerotinia fructigena*. Solutions or suspensions of 0.01%, 0.001% and 0.0001% concentrations of the test compounds of Table I are then prepared. The spores, washed from the slants with distilled water, are added to these solutions or suspensions. These solutions or suspensions are then agitated for 24 hours on a tumbling machine, after which they are examined for number of spores killed. Table I shows the minimum concentrations giving 95–100% kill after 24 hours.

Table I

| Compound | Conc. (percent) for 95-100% Kill | |
|---|---|---|
| | Sclerotinia fructigena | Stemphylium sarcinaeforme |
| 3-Bromo-1,2-naphthoquinone 1-oxime | 0.001 | 0.001 |
| 6-Bromo-1,2-naphthoquinone 1-oxime | 0.001 | 0.001 |
| 7-Methoxy-1,2-naphthoquinone 1-oxime | 0.001 | 0.001 |
| 3-Chloro-1,2-naphthoquinone 1-oxime | 0.001 | 0.001 |
| 3,6-Dibromo-1,2-naphthoquinone 1-oxime | 0.001 | 0.001 |
| Sodium salt of 1,2-naphthoquinone 1-oxime | 0.001 | 0.001 |

EXAMPLE 2

Two week old cucumber plants of the Green Prolific variety are sprayed to run-off with acetone-water solutions containing the compounds of table II in varying concentrations. After the spray deposits dry, the plants are inoculated with a conidial suspension of cucumber anthracnose fungus (*Colletotrichum lagenarium*). Results appear in Table II.

Table II

| Compound | Conc. (p.p.m.) | Number of lesions | Percent Disease |
|---|---|---|---|
| Control (50% Acetone in H₂O) | | 256 | 100 |
| 3-Chloro-1,2-naphthoquinone 1-oxime | 100 | 0 | 0 |
| | 50 | 0 | 0 |
| | 25 | 27 | 10.5 |
| 6-Bromo-1,2-naphthoquinone 1-oxime | 100 | 1 | 0.4 |
| | 50 | 7 | 2.7 |
| | 25 | | |
| 7-Methoxy-1,2-naphthoquinone 1-oxime | 100 | 0 | 0 |
| | 50 | 8 | 3.1 |
| | 25 | 8 | 3.1 |
| 3-Bromo-1,2-naphthoquinone 1-oxime | 100 | 1 | 0.4 |
| | 50 | 0 | 0 |
| | 25 | 3 | 1.2 |
| 3,6-Dibromo-1,2-naphthoquinone 1-oxime | 100 | 2 | 0.8 |
| | 50 | 6 | 2.3 |
| | 25 | 9 | 3.5 |

We claim:

1. A method for protecting organic materials susceptible to attack by fungi which comprises applying to said material at least one member selected from the group consisting of 1,2-naphthoquinone 1-oximes and the alkali metal salts thereof, said oximes being represented by the formula

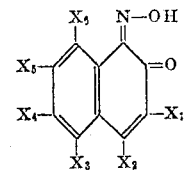

in which $X_1$–$X_6$ are selected from the group consisting of hydrogen, hydroxy, alkoxy and halogen.

2. A method according to claim 1 in which the member is 1,2-naphthoquinone 1-oxime.

3. A method according to claim 1 in which the member is a 3-halo-1,2-naphthoquinone 1-oxime.

4. A method according to claim 1 in which the member is a 6-halo-1,2-naphthoquinone 1-oxime.

5. A method according to claim 1 in which the member is a 3,6-dihalo-1,2-naphthoquinone 1-oxime.

6. A method according to claim 1 in which the member is a 7-alkoxy-1,2-naphthoquinone 1-oxime.

7. A method according to claim 1 in which the member is a 3-hydroxy-1,2-naphthoquinone 1-oxime.

8. A method according to claim 1 in which the member is an alkali metal salt thereof.

References Cited in the file of this patent

Elsevier's Encyclopedia of Organic Chem., Ser. III, vol. 12B, 1952, pp. 2730 and 2748.
Chem. Abst. (2), vol. 17, 1923, p. 1218[4].
Chem. Abst. (3), vol. 41, 1947, p. 1728[4].